Oct. 10, 1933.  G. W. VAN VUREN  1,929,833
TACKLE BOX
Filed Feb. 15, 1932
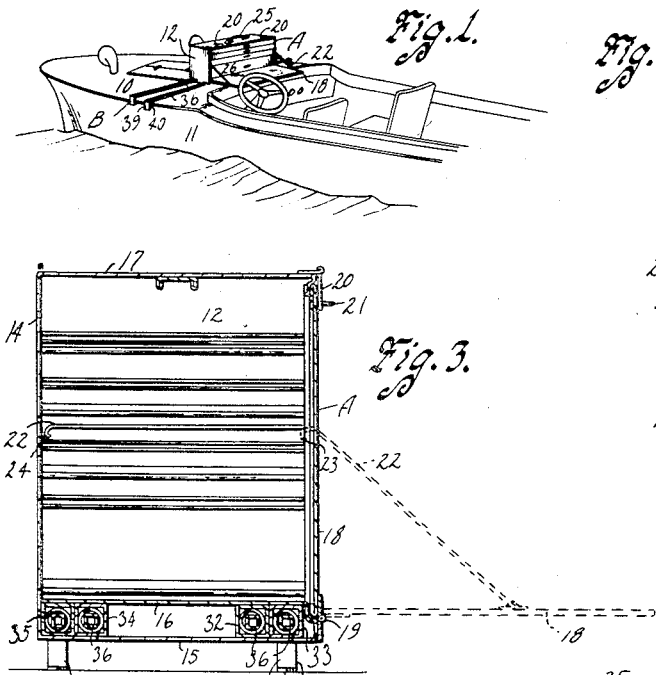
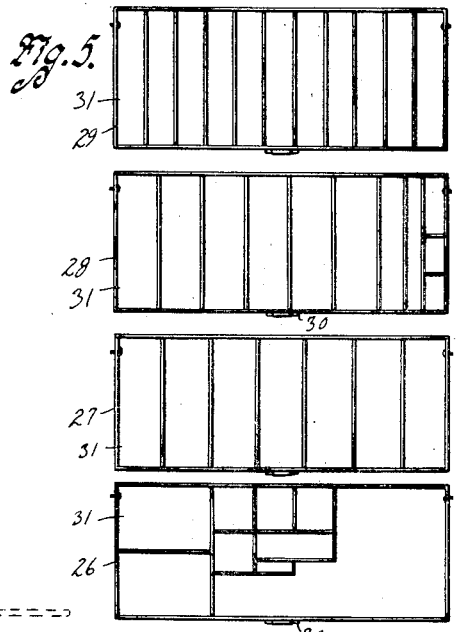
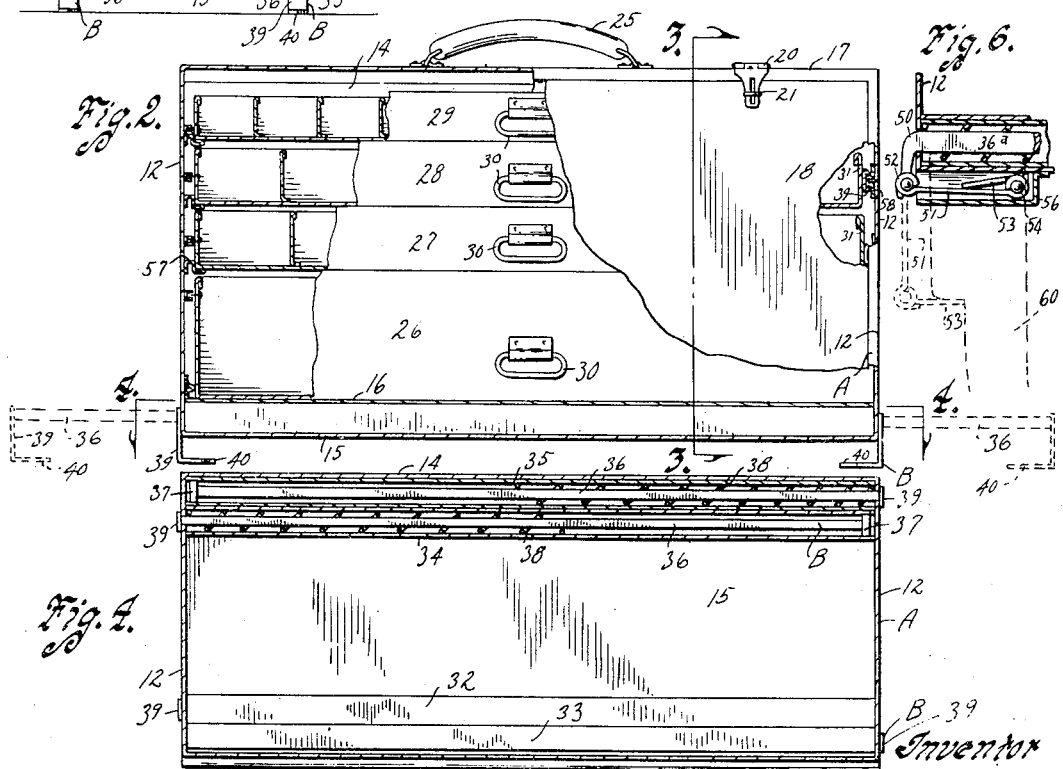
Witness
A. S. Menjenmair
Inventor
Guy W. Van Vuren
by Bair, Freeman & Sinclair
Attorneys Patented Oct. 10, 1933

1,929,833

UNITED STATES PATENT OFFICE 1,929,833

TACKLE BOX

Guy W. Van Vuren, Chippewa Falls, Wis.

Application February 15, 1932. Serial No. 593,065

6 Claims. (Cl. 43—31)

The object of my invention is to provide a tackle box of novel construction adapted to safely hold an extensive variety of lures and other fishing tackle to afford ready accessibility and to keep the different kinds of bait conveniently separated.

A further purpose is to provide a tackle box or other suitable container with extensible means normally contracted to be out of the way, but adapted to be projected away from the container and fastened to a rigid support, such for instance as the cowl or gunwales of a boat.

It is my purpose in this connection to provide extensible fastening means of particular construction adapted for the purpose.

Still a further object is to provide a tackle box or container with such extensible securing means and to provide the container with a member adapted to serve as a closure or to be moved to position where it can be used as a shelf, the parts being so arranged that the extensible fastening devices will hold the container upright with the shelf in proper position for use.

I desire to provide the device as thus explained with a series of trays, which may be drawn out from the front side of the container normally closed by the closure member when the latter is in shelf position.

With these and other objects in view, my invention consists in the construction, arrangement and combination of the various parts of my tackle box, whereby the objects contemplated are attained, as hereinafter more fully set forth, pointed out in my claims, and illustrated in the accompanying drawing, in which:

Figure 1 is a perspective view of part of a boat having my tackle box mounted thereon.

Figure 2 is a front elevation of the tackle box, parts being shown in vertical section.

Figure 3 is a transverse, vertical sectional view taken on the line 3—3 of Figure 2.

Figure 4 is a horizontal, sectional view taken on the line 4—4 of Figure 2, the rear guide member tubes being shown in section.

Figure 5 is a plan view of the trays removed from the box; and

Figure 6 is a vertical, sectional view through the bottom of the box near one corner illustrating the construction of a modified form of engaging device of one end of one of the extensible fastening devices.

In using a tackle box, no device is procurable for holding the tackle box rigidly or otherwise in place, so that it will not be upset and throw the lures and other equipment out.

It is desirable to have some way of securely fastening the tackle box in place. For instance, it is convenient to mount tackle boxes on the cowl or gunwales at different places of a boat 11.

In the drawing, I have shown a tackle box, comprising a casing indicated generally at A. The casing A has the end walls 12, the rear wall 14, the bottom 15, the spaced false bottom 16, the top 17 and the front wall 18 hinged as at 19 at its lower edge.

Suitable latch means 21 are provided for locking the movable closure member 18 forming the front wall in closed position.

The closure member 18 has pivoted to its inner surface a pair of braces 22 slidably mounted in guide eyes 23 supported on the end walls 12. The braces 22 have hooks 24 at their rear ends and are of such length that when the member 18 is swung outwardly and downwardly, it will be supported by the braces in horizontal position, as illustrated in dotted lines in Figure 3. When in such position, the closure member 18 forms a shelf very convenient for the user of the tackle box.

The top which cannot be opened, thereby doing away with contents being spilled by top opening when being carried, is provided with a handle 25.

Slidably mounted in the box is a series of vertically spaced trays 26, 27, 28 and 29 provided with handles 30 and adapted to be drawn out partially through the open front side of the tackle box when the closure member 18 is down.

These trays may have compartments 31 of varying sizes adapted to hold lures and other equipment for the fishermen and to keep the various lures separate which is desirable.

I have provided means for quickly fastening the tackle box rigidly on practically any boat, comprising extensible members slidably mounted in the space between the bottom 15 and the false bottom 16 when not in use and adapted to be extended for engaging the boat or other support on which the box may be mounted.

Near the front of the tackle box is a pair of tubes or sleeves 32 and 33. Similar sleeves or tubes 34 and 35 are mounted side by side beneath the false bottom 16 at the rear of the tackle box.

Mounted in each sleeve 32—35 is a slidable square rod 36. The sleeves and rods are preferably angular in cross section and the rods may be tubular for saving weight.

The respective rods of each pair of sleeves are slidably extended through the opposite ends of the tackle box.

Each rod 36 has on its inner end a plunger head or the like 37 and is surrounded by a coil spring 38, which is contracted between the head 37 and flange end of the sleeve 32—35 at the opposite end of the rod. By means of the coil spring, the rod in each case is normally held in retracted position telescopically received in its sleeve except for the short portion projecting from the tackle box.

On the projecting end of each rod is a hook member, which may be as shown in Figure 2, comprised of a downwardly extending part 39 and a pointed right-angled extension 40.

In installing the tackle box on the gunwales of a boat, for example, the rods 36 are drawn out against the tension of their springs and the hook members indicated generally at B in Figure 1 are extended over the side of the boat until the hook members 40 can be gripped or engaged against the side of the boat over the gunwales. They may be forced into the boat material a little, if desired.

The tackle box is thus not only fastened in place on the gunwales or cowl but is held rigidly in upright position, where the member 18 may be used as a shelf if desired.

When the user wants to get at the contents of the tackle box, he lowers the closure member 18 from its full line position shown in Figure 3 to its dotted line position as illustrated in that figure, where it can be used as a shelf. Any of the trays may then be drawn out to get access to its contents. The lures, lines, leaders, reels and other equipment may be laid on the shelf if desired. If there is any sudden jar to the boat, or the boat capsizes, the tackle box cannot be upset or become detached from the boat.

In Figure 6, I have shown another form of the extensible members. Instead of the rod 36, I have shown a rod 36a, having at the end a down-curved end 50 to which is pivoted a leg 51 by means of a hinge 52. The hinge 52 permits a swing of the leg 51 from horizontal to vertical position.

The leg 51 has at its outer end hinged to it a gripping finger or the like 53 adapted to engage the side of a boat or other support as shown by dotted lines in Figure 6. The finger 53 is preferably somewhat sharpened at its free edge and is hinged to the leg 51 by means of a hinge 54, which permits a 45° swing so that the finger 53 can swing from position substantially parallel with the leg 51 to position substantially at right angles thereto. These two positions are illustrated in full lines and in dotted lines in Figure 6.

Secured to the bottom of the box A below the outer end of each sleeve 32—35 is a short case 56 open at one end as shown in Figure 6, and so arranged that when the rod 36a is moved from extended toward retracted position, the leg 51 may be folded up to horizontal position with the finger 53 folded back on it and both the finger and leg may be inserted into the short case 56. Thus when the extension fastening devices are not in use, the legs 51 and fingers 53 are protected and can not catch and do any harm. The cases 56 also serve as supports for the tackle box.

I prefer to manufacture the device in the form shown in Figure 6.

It will be noted that I have shown in Figure 2 at the opposite ends thereof different ways for slidably mounting the trays in the box A.

As shown at the left-hand side, the ends of the upper trays may be slid on shelf-like members 57 or as shown at the right-hand side of the same figure, the inner face of the wall of the end of the box may be provided with guides 58, which are contracted at their portions adjacent to the end wall. The ends of the upper trays are then provided with channel-like guide members 59 having their opposite walls slightly inclined toward each other as illustrated.

It is obvious that the structure itself has to be convenient for mounting on almost any kind of a boat. In Figure 1, I have shown the box mounted on the cowl of a launch. The box can be mounted on an open row boat with the extensible members supported on the gunwale as illustrated for instance in Figure 6.

It is obvious from the foregoing that numerous changes might be made in the details of the construction and arrangement of the parts of my improved tackle box without departing from the spirit and purpose of my invention, and it is my intention to cover by my claims, any modified forms of structure or use of mechanical equivalents, which may be reasonably included within the scope of my invention and of my claims.

I claim as my invention:

1. In a structure of the class described, a container, extensible means on the container for engaging a rigid support at a distance from the container for holding the support fixedly upright, said means comprising rods slidably mounted on the container, having fastening means for engaging the support and springs having coacting engagement with the container and the rods for normally holding the rods retracted.

2. In a structure of the class described, a container, extensible means on the container for engaging a rigid support at a distance from the container for holding the support fixedly upright, said means comprising rods, means for slidably but non-rotatably mounting the rods on the container, having fastening means for engaging the support and springs associated with the container and the rods for normally holding the rods retracted.

3. In a structure of the class described, a container, extensible means on the container for engaging a rigid support at a distance from the container for holding the support fixedly upright, and comprising rods, means for slidably but non-rotatably mounting the rods on the container, provided with hooks at their ends, and springs associated with the container and the rods tending to draw the rods to retracted position.

4. In a structure of the kind described, a container, rods, means for slidably but non-rotatably mounting the rods substantially horizontally in the lower part of the container, means tending to yieldably pull the rods toward retracted position and members on the ends of the rods for engaging a support, whereby the container may be set on a support and fastened thereto.

5. In a structure of the class described, a container, extensible means carried by the lower part of the container for engaging a rigid support at a distance from the container on opposite sides thereof, said means comprising pairs of rods slidably mounted in the container adjacent the bottom thereof adapted to be slid out in opposite directions from the container and having means at their ends for engaging a support, and means for preventing rotation of the rods.

6. In a structure of the kind described, a container, pairs of rods slidably mounted in the bottom of the container, means for preventing rotation of the rods, springs associated with the container and the rods for holding the rods normally retracted, each rod having at its ends a pivoted means for engaging the sides of a support, said container having a chamber for receiving said pivoted means when the rods are in retracted position.

GUY W. VAN VUREN.